Figure 8:
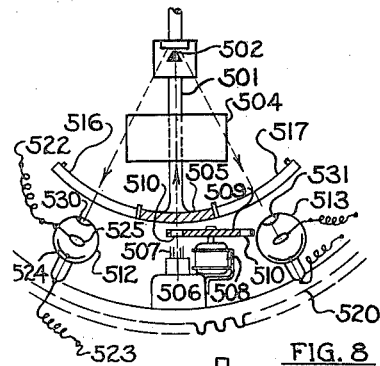

Jan. 22, 1935.  N. MINORSKY  1,988,458
ELECTRICAL CONTROLLING SYSTEM
Filed Dec. 27, 1930    2 Sheets-Sheet 1
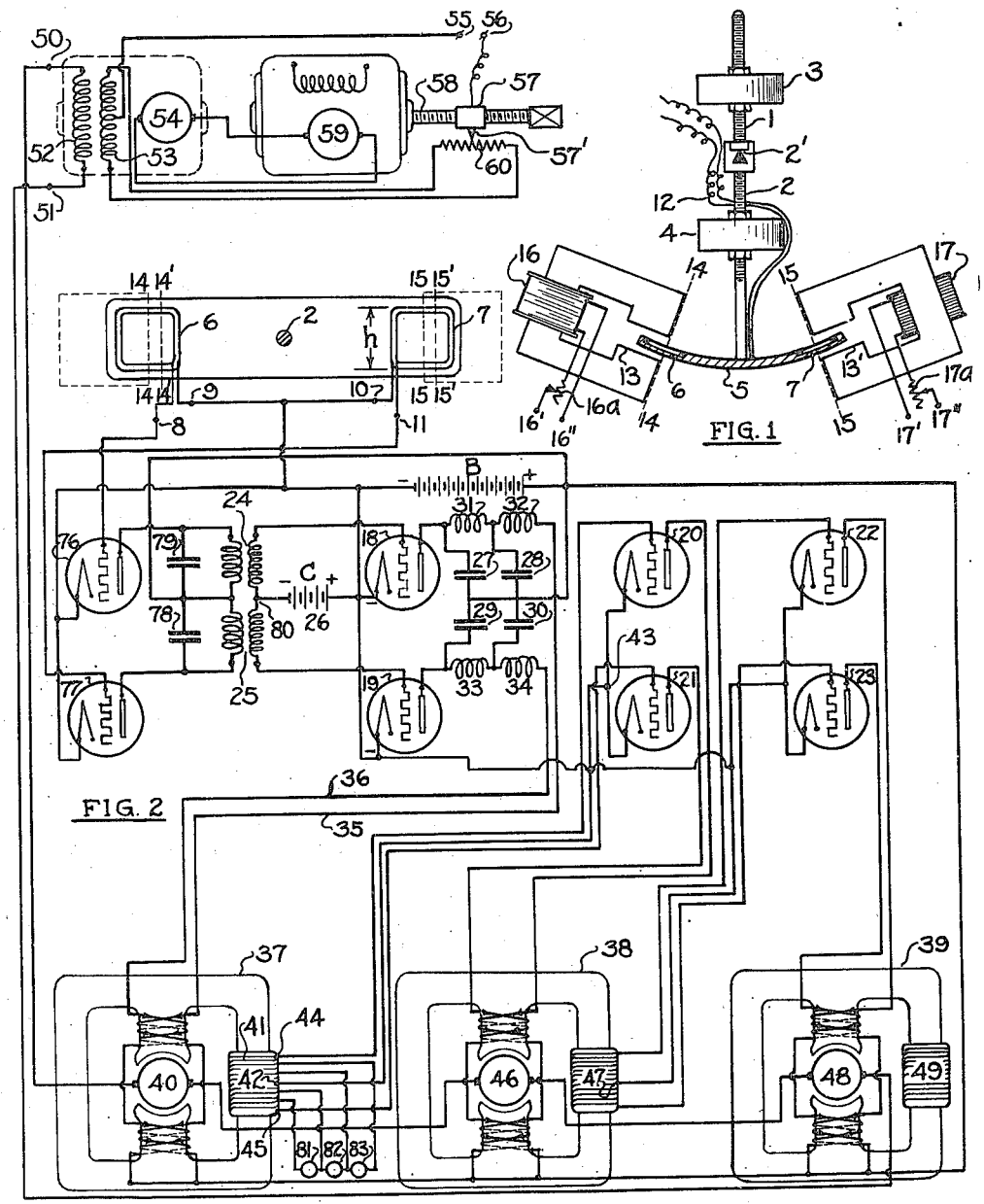
INVENTOR.
Nicolai Minorsky
BY Frank H. Borden
ATTORNEY.

Jan. 22, 1935.     N. MINORSKY     1,988,458
ELECTRICAL CONTROLLING SYSTEM
Filed Dec. 27, 1930     2 Sheets-Sheet 2

INVENTOR.
Nicolai Minorsky
BY Frank H. Borden
ATTORNEY.

Patented Jan. 22, 1935

1,988,458

UNITED STATES PATENT OFFICE 1,988,458

ELECTRICAL CONTROLLING SYSTEM

Nicolai Minorsky, Swarthmore, Pa.

Application December 27, 1930, Serial No. 505,194

15 Claims. (Cl. 172—239)

This invention relates to improvements in electrical controlling systems generally, and particularly to electrical controllers applicable to systems of so called "follow up" types.

By a "follow up system" in the following is understood a controlling system in which there are two principal elements present, namely, a primary element generally serving as a reference element either for indicating a certain direction in space or a certain state of motion, and a secondary element generally operatively associated with an independent source of power such as an electric or other motor for the purpose of following up the primary element.

In addition to these elements any follow up system has also a control system controlling the source of power above referred to in such manner that any relative motion or displacement between the primary and the secondary elements of the follow up system, counted from a predetermined zero point, causes the source of power to move the secondary system until the initial relative motion or displacement is reduced and both elements are again in a predetermined relative position with respect to each other, which is equivalent to the zero point for the follow up control.

The follow up systems are used extensively in cases where the primary element is a delicate instrument having no, or a very small, directive force and where therefore, it is necessary to use a source of external power in order to obtain from such instrument a necessary controlling action.

The relative displacements or motions above referred to can be either rectilinear or angular.

A well known example of a follow up system is given by modern gyroscopic compasses, where the primary element is a so called gyroscopic sensitive element, the secondary element is a so called "follow up" or "phantom system", and the external source of power, above referred to, is a so called, "azimuth motor", operatively connected with the follow up gear rotating the secondary element in azimuth.

In this example both primary and secondary systems have also an additional angular motion relatively to the support (i. e. ship). With respect to the meridian the primary element maintains a fixed predetermined azimuthal position and it is the purpose of the follow up system that the secondary system should keep the same position. It must be noted that in all cases any follow up system responds to a relative displacement or movement between its primary and secondary elements.

Follow up systems are known in which the secondary power operated system is controlled in response to the departure of the system from the position shown by the primary system utilizing either mechanical contacts or vacuum tubes. Such systems work satisfactorily only when the mass in the rectilinear, or the moment of inertia in the angular movement of the secondary system is small, as this is the case of the follow up systems of modern gyroscopic compasses where a small oscillation or "hunt" is not objectionable. In cases where the mass (or moment of inertia) is considerable such simple method of control ceases to be adequate, the secondary system either lags or overshoots its proper position with respect to the primary system.

Improvements are also known in which in order to obviate the above mentioned difficulty, discontinuously acting control means responsive to the rate of the relative motion were suggested. These supposedly improved methods afford only a partial solution of the problem.

The present invention has for its purpose to provide an improved follow up system devoid of the above mentioned defects.

The fundamental idea of this invention can be formulated better mathematically. Assume that the primary element possesses a certain motion which the secondary element must follow. This motion may be represented by a certain continuous function $\theta$ of time $\theta = \theta(t)$. If the controlling system could act with infinite rapidity and no inertia of any kind (either mechanical or electromagnetic) were present the "following up" would be perfect. In reality on account of the time lags the instantaneous response of the instrument exerted upon the controlling means at a certain instant of time, say $t_0$, in reality will be reproduced by the controlling system at the instant $t_0 + \Delta t$ where $\Delta t$ is the time lag above referred to.

The value of the function at time $t_0 + \Delta t$ is $\theta(t_0 + \Delta t)$. If $\Delta t$ is relatively small in comparison with time $t$ determining the motion $\theta = \theta(t)$ we can apply Taylor's expansion and write:

$$\theta(t_0 + \Delta t) = \theta(t_0) + \Delta t \left(\frac{d\theta}{dt}\right)_0 + \frac{\Delta t^2}{2!}\left(\frac{d^2\theta}{dt^2}\right)_0 + \cdots + \frac{\Delta t^n}{n!}\left(\frac{d^n\theta}{dt^n}\right)_0 + \cdots$$

where $$\left(\frac{d\theta}{dt}\right)_0, \left(\frac{d^2\theta}{dt^2}\right)_0, \cdots \left(\frac{d^n\theta}{dt^n}\right)_0$$

are subsequent time derivatives of the function $\theta(t)$ considered at the instant $t_0$.

The series on the right side is generally convergent and the conditions of convergence are governed by the nature of the function $\theta$ as well as by the magnitude of the lags $\Delta t$. In most cases the addition of one or two terms to $\theta(t_0)$ gives the degree of approximation which is satisfactory from a practical standpoint, neglecting the terms of higher orders.

We may modify somewhat the preceding expression by putting $t_o + \Delta T = T_o$ or $t_o = T_o - \Delta T$ in which case the above equation is written $$\theta(T_o) = \theta(T_o - \Delta T - \Delta T \left(\frac{d\theta}{dT}\right)(T_o - \Delta T) + \frac{\Delta T^2}{2}\left(\frac{d^2\theta}{dT^2}\right)(T_o - \Delta T) - \ldots$$

The functions on the right side all relate to the instant $(T_o = \Delta T)$ preceding the instant $T_o$ for which the right side function is specified.

In other words, it is possible theoretically to produce a correct controlling action at each given instant $(T_o)$ and to compensate for any time lags which may exist normally in any follow up system due to its inertia and similar causes if this controlling action is built up of a series of component controlling actions all relating to the past instants of time $(T_o - \Delta T)$ provided these controlling actions are responsive to subsequent higher time derivatives $$\frac{d\theta}{dt}, \frac{d^2\theta}{dt^2} \ldots \frac{d^n\theta}{dt^n} \ldots$$

It must be noted that the above described method is applicable to any movement $\theta(t)$ to be followed whether periodic or not, regular or irregular provided the function $\theta(t)$ is continuous admitting derivatives of higher orders which is always the case in practice.

The possibility afforded by this novel method of the follow up control permits of extending the application of the expression "follow up system" to systems in which owing to excessive inertia the time lags would be too considerable if the known methods were applied.

This present invention also provides means for modification of the functional relation $\theta = \theta(t)$ laid down as the basis for controlling actions which permits to obtain any predetermined controlling action to meet any desired type of performance.

For example assume that the original motion which is to be either mastered or "followed up" by the secondary system is of the simplest type $\theta = kt$, that is the coordinate $\theta$ changes proportionally to the time $t$, $k$ being the factor of proportionality and the controlling action, say, a certain current $i$ changes also in proportion to the time so as to have finally $i = K.t$ where $K$ is another suitable coefficient of proportionality. The present invention provides means for modifying the relation so that $i = f(t)$ can be any predetermined function. For example one can have a relation of the type $i = K_1 t^n$ where $n$ is an exponent either positive or negative, greater or smaller than unity and $K_1$ another constant. All the subsequent time derivatives will be also changed insofar as they will relate to the function $i = K_1 t^n$ and not to the original function $i = Kt$. It is possible in this manner to modify at will and in a perfectly continuous manner the characteristics of the controlling system and to eliminate the time lags by the compensating action of higher time derivative responsive means.

As a preferred embodiment of this invention I show the case in which the controlling system is actuated by the variation of the flux of a physical quantity of vector operatively associated with one (say primary) system and received by the other (say secondary) system or vice versa. The predetermination of the functional relation above referred to is introduced in the law of variation of said physical quantity as a function of the relative motion.

By way of example I show in one embodiment alternating magnetic flux as the physical quantity above referred to and in the other the radiation of any suitable wave length.

In summing up the principal advantages of the proposed method consist in the provision of means for varying the characteristics of the controlling means and to eliminate the lags in the system by building up a resultant controlling action approximating that which is given by Taylor's expansion.

This feature of the invention may be carried out by producing a predetermined form of the moving coil in the case of magnetic flux or by a predetermined distribution of the radiation absorbing material in the case of the radiation responsive means.

These predetermined forms or distributions in accordance with the aforesaid provide predetermined functional relations between the response and the actual motions which may be entirely different from those which could be governed by the actual motion.

Thus, for example, a very flat characteristic of the initial motion can be transformed into a rather steep characteristic or vice versa whereby the properties of controlling action may be varied at will within very large limits.

As examples of "follow up" systems where the above mentioned method is used one can cite the case of antirolling stabilization of ships by means of a suitably timed athwartship displacement of a moving weight. The primary element in this case is the long period pendulum and the secondary element is the ship itself but the accuracy in "following up" the upright position is due to the effect of higher time derivatives as shown above.

Stabilization of guns, instruments and similar objects which must preserve a predetermined direction in space in spite of rolling and pitching movements of the ship is another example of the follow up control in the above defined sense. In fact the direction indicating instruments such as compass for azimuthal direction and a long period pendulum for the elevation constitute the primary elements (one for each angular coordinate) of the follow up system, and the guns, instruments and other objects that must be pointed at a target constitute the secondary elements thereof. The problem of continuous aim in this manner can be identified with that of a follow up system built for two angular degrees of freedom of the stabilizing system and again the elimination of the time lags is produced by the higher time derivative responsive means.

Finally the above definition of a follow up system can be still further extended if one agrees to understand that in a follow up system "the following up" relates not only to certain spatial (linear or angular) relations between the primary and the secondary elements but also to a certain state of motion of these elements. Thus, for instance, in a system formed by a prime mover (e. g. steam turbine) and the centrifugal or any other speed responsive governor—the primary element of the follow up system is the centrifugal element of the governor, or its equivalent, and the secondary element is formed by the rotors of the turbine and electric generator. The "following up" of a certain predetermined value of angular velocity can be produced in the form of a certain space relation between the height of the control member on the shaft of the speed responsive element and the opening of the valve controlling the admission of working fluid to the prime mover.

In many other problems of the control of movement of dynamical systems this "follow up" nature of the controlling system can easily be traced out in this manner.

It is well known that the performance of known follow up systems in general is considerably impaired by two fundamental disturbing factors:

1. Reaction from the secondary system back on the primary;
2. Inadequate phase of the follow up control.

The first mentioned factor is particularly harmful when the primary element of the follow up system has no, or only a very limited amount of directive force being of the same order of magnitude as frictional reactions between the primary and secondary elements of the follow up system. Thus in the above example of ship stabilization of the type disclosed in my copending patent application Ser. No. 415,663, filed December 21, 1929, any material contacts between the pendulum and the ship may transmit the disturbing motion from the ship back on the pendulum which eventually will be set in motion instead of maintaining the true vertical direction at all times. As a result of this there will be an erratic behaviour of the stabilizing equipment. In case of centrifugal or other speed regulating governors analogous frictional reactions introduce well known difficulties, viz. the starting of the governor in response to a speed variation of the prime mover is generally delayed by the static friction which thus introduces a certain band of insensitiveness within which the speed of rotating machines to be controlled may vary or "float" without any response on the part of the governor. Once, however, the regulator is started the dynamical friction makes it impossible for the governor to reach a correct position adequate from the standpoint of the instantaneous condition whence the "overshooting", "hunting" and similar harmful phenomena well known in the art.

From the preceding statement it is apparent that the two above mentioned fundamental disturbing factors are to a certain extent interdependent. Thus, as is shown in the above example, the dynamic friction brings about the wrong phase of the control action as its result. In some other cases the wrong phase of the control action appears as a primary factor or cause for example, from the differential equations of motion of dynamical systems controlled about a predetermined point of equilibrium in response to the instantaneous value of departure of the system from this predetermined point of equilibrium follows that the system must necessarily oscillate or hunt unless a sufficient amount of an artificially created damping obtained by dashpots, and the like, is produced. These dashpots and similar damping devices do not eliminate the cause of the disturbing oscillations due to the wrong phase of the control action but attempt only to reduce its effect—hence only a partial success of such devices for the purpose in view. Similar harmful effects of oscillations or hunting are known in connection with the follow up systems of gyroscopic compasses where again the cause can be traced back to the wrong phase of the control responsive only to the deviation.

It is the purpose of the present invention to provide a follow up controlling system in which the above described disturbing phenomena are eliminated by the elimination of the disturbing causes rather than attempts to reduce or modify their effects.

I am able to eliminate the first mentioned disturbing cause by establishing an operative association of a device producing or directing the flux of a physical directed quantity or vector, in space and supported by or operatively associated with one (either primary or secondary) element of the follow up system and of another device supported by or operatively associated with the other element of said system and responsive to the amount of the flux received across its limiting boundary or surface.

The word "flux" generally is used in two different senses. First in ordinary language it is generally used for the purpose of a qualitative designation of certain directed physical quantities. The expressions "electric flux", "magnetic flux", "luminous flux" and the like are examples of such a qualitative loose use of the word "flux". This is the scope of the general term "flux" as used herein. Second, in science to the word "flux" is reserved a well defined quantitative meaning, namely, the "flux" of a physical directed quantity, or vector, designates in this last mentioned sense the product of the intensity of the field of this directed quantity or vector times the area of the flux receiving element, times the cosine of the angle formed between the positive direction of the normal to the surface of the flux receiving element, and the direction of incidence of the vector of the field at the surface of the element.

In the above broad statement of the invention, and as used later herein, I am making use of the expression "amount" of the "flux" in the last mentioned quantitative definition used in science.

As a preferred embodiment of this invention I show an application of this method to the case when the flux of the physical directed quantity, or vector, is an alternating magnetic flux, the flux producing device is an alternating current electromagnet supported by one element of the follow up system, and the flux receiving device or member is a coil or a plurality of coils supported by the other element of said follow up system.

The operative association between the flux producing and the flux receiving elements in this case is obtained through the instrumentality of variation of the coefficient of mutual induction between the coils producing and receiving the flux resulting from the relative motion between the primary and the secondary elements of the follow up system.

By way of another example illustrating the broad scope of this invention I show an arrangement in which the flux of the physical directed quantity, or vector, is a luminous flux, the flux producing device is a light producing and converging apparatus of an ordinary projection type supported by one element of the follow up system, and the flux receiving device, or member, is a radiation responsive device or devices such as photoelectric, photolytic, selenium cells or plurality of such cells, and the like, supported by the other element of said follow up system.

The operative association between the flux producing and flux receiving means in this case is obtained through the instrumentality of either variation of electron emission of known substances under the influence of light, or of variation of conductivity of a light responsive medium or similar phenomena well known in the art.

Although I have disclosed these two cases which are most important from the practical standpoint at the present state of art, it is my intention to limit the scope of the invention by the scope of the appended claims.

As regards the elimination of ponderomotive effects in case the variation of the coefficient of mutual induction of a coil moved in an alternating magnetic field as a result of a relative movement between the primary and the secondary elements of the follow up system is used, I am able to produce such elimination by applying the electromotive force induced in said coil to the electrostatically controlled continuously acting relays such as electron discharge tubes and the like, whereby any ponderomotive forces or reactions between the flux producing or flux receiving elements and, hence, between the primary and the secondary elements of the follow up system are practically eliminated.

Any departure of the secondary element to be controlled from a predetermined relative position, with respect to the primary element causes a variation in the number of flux linkages with the turns of the coil which thus produces the amplitude modulation of alternating electromotive force (or forces) applied to the grid (or grids) of the first stage of the control system.

By mounting the coil on a non-magnetic and non-conducting material I am able to eliminate the remaining ponderomotive forces of the electromagnetic field and to render thus the primary element of the follow up control entirely immune against any disturbing reactions on the part of the secondary, which permits thus of using high precision sensitive direction indicating and other instruments as primary elements in the control without any danger of disturbing their accuracy by said reactions.

In case of light responsive devices, as is apparent, no such ponderomotive forces exist between the flux producing and flux receiving agencies if one disregards the so called "pressure of radiation" whose order of magnitude is vanishingly small in comparison to anything that is of importance in a practical invention.

As regards the second feature, that of an adequate phase of the control action, as it has been already disclosed in my Patent No. 1,436,280 relative to automatic steering of vessels and in my co-pending patent application Ser. No. 415,663, filed December 21, 1929, relative to improvements in antirolling stabilizers, the problem admits of a theoretically correct solution if in addition to controlling means responsive to the deviation of the system to be controlled from a predetermined direction (or predetermined state of motion) the control is made also to respond to higher time derivatives of such a deviation. In my previous inventions the deviation responsive action on the one hand, and higher time derivatives responsive actions on the other hand, are obtained by means of separate instruments. In this present invention the instantaneous deviation and the higher time derivatives of such deviation are obtained or produced in a single instrument and associated circuits directly responsive to the deviation.

As a preferred embodiment I have shown the application of these principles with respect to a follow up controlling system adapted to stabilize a ship against rolling and deriving its control from relative angle between the long period pendulum and the ship.

The invention, however, is much broader than this limited application thereof and, by way of another example, I have indicated, in conformity with the above stated generalization of the follow up definition also its application in connection with the speed regulating governors for prime movers such as steam turbines and other engines.

Finally, in some cases the follow up action may not be necessary as any electrical instrumentality may be actuated in place of a follow up device, such as indicating, measuring or recording devices, in which only the first mentioned function i. e. absence of any frictional reactions is sought. In such cases the proposed system may be used equally well for indicating, measuring, recording or other controlling purposes as noted. In such a case desired electrical instrumentalities can be continuously controlled by delicate instruments without subjecting them to any frictional or other reactions which might otherwise interfere seriously with the accuracy of their performance. By way of example I have indicated this particular application in connection with the angular velocity indicating apparatus disclosed in my Patent No. 1,372,184. It also, obviously, may be of use in connection with the indicating and recording obtained from high precision direction or position indicating or maintaining instruments, such as pendulums, compasses, seismographs, and the like.

Broadly stated the invention consists in the provision of a method and means for deriving certain electrical action for the purpose of either controlling, or indicating the equilibrium condition of a dynamical system or, more generally, of a system having characteristics substantially similar to those of a dynamical system, by means of an operative association of a ponderomotive and antifriction type between flux producing and flux receiving elements respectively associated in an operative relation with primary and secondary elements of the follow up system, and by actuating by said controlling actions, or by exhibiting them for the purpose of control, a controlling system in response to the departure of the dynamical system from its predetermined either spatial, dynamical or other equilibrium point and also in response to the plurality of higher time derivatives of said departure.

Figure 9:
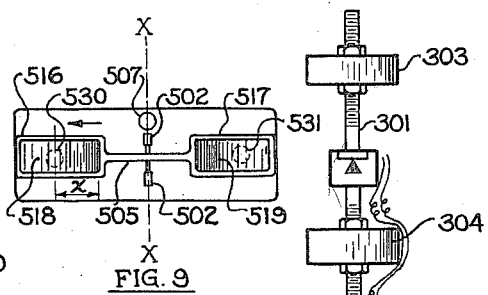
Figure 4:
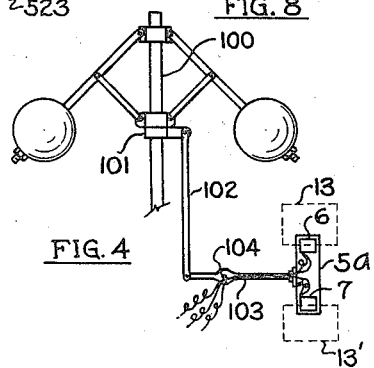
Figure 5:
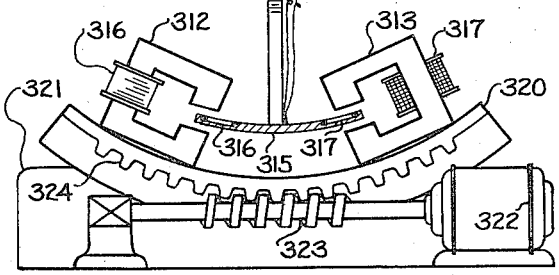
Figure 6:
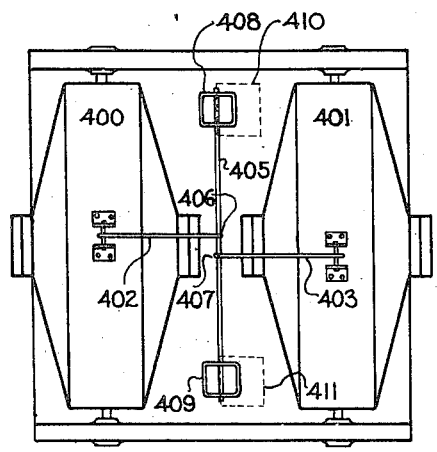
Figure 7:
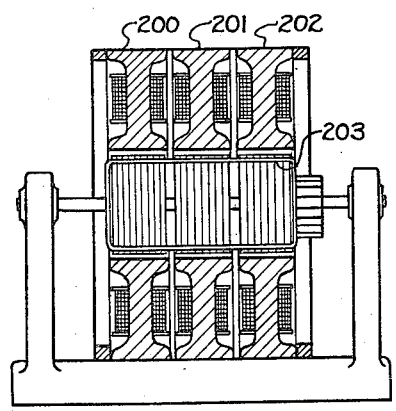

Many other features and advantages of this controlling system will be apparent from the following description illustrated by the drawings in which Fig. 1 represents diagrammatically the side elevation of the pendulum control, Fig. 2 shows the wiring diagram of controlling circuits used in connection with the instrument shown in Fig. 1 with said instrument shown diagrammatically in a horizontal section, Figs. 2a and 2b represent diagrammatic illustrative plans of coils of different geometric formation of the infinite number of such forms that may selectively be used to secure predetermined controlling actions as a predetermined function of the relative displacement, Fig. 3 shows adaptation of the instrument shown on Fig. 1 for a simultaneous antirolling and antipitching stabilization, Fig. 4 shows an application of the system shown on Figs. 1 and 2 with slight modifications rendering it effective for use in connection with a speed responsive governor for prime movers, Fig. 5 shows a simplified follow up control derived from a pendulum effective for directional stabilization, Fig. 6 shows an application of the disclosed controlling system in connection with angular velocity indicating apparatus, Fig. 7 shows a modification of a part of the arrangement shown on Fig. 2, Fig. 8 shows an arrangement similar to that shown on Fig. 1 but using radiation responsive control instead of the controlling means disclosed in connection with Fig. 1, and Fig. 9 shows a horizontal projection of the device shown on Fig. 8.

Referring to Fig. 1, 1 represents a pendulum supported by the knife edge 2' of an external support (not shown) suitably mounted on the ship. For the sake of example the following arrangement of the control circuits is shown in connection with the antirolling stabilization of the ship. In this case the degree of freedom of the pendulum is about the axis passing through the knife edge 2' perpendicular to the plane of Fig. 1 and parallel to the longitudinal axis of the ship. The pendulum itself does not form the subject of this invention and is shown diagrammatically in a conventional manner as being comprised of the rod 2 threaded on its upper and lower parts. The counterweights 3 and 4 can be suitably positioned on the threaded parts of rod 2, with respect to the supporting edge so as to obtain any desirable period of oscillation. For the purpose in view I propose to use a long period pendulum i. e. a pendulum whose period is considerably longer than the period of ship's rolling. Particularly suited for this purpose are gyroscopic pendulums of the so called "artificial horizon" type.

It is known that a pendulum of this type is not influenced appreciably by the accelerations prevailing on the ship and keeps the direction of the true gravity even if the ship is rolling. The above condition can be still better attained if the pendulum is placed near the so called, "tranquil point" of the ship and is suspended within a case which itself is suspended in an antivibration manner with respect to the ship. Under these conditions the pendulum is a high precision instrument immune against all kind of vibrations and accelerations of the ship and is capable of indicating the true vertical line. Strictly speaking the ship changes its angular position relatively to the pendulum but from the standpoint of convenience of phraseology use is made of the expression "angular motion of the pendulum", meaning angular motion (equal and opposite) of the ship relatively to the pendulum, which latter is directed always along the true vertical in space.

On a lower part of the pendulum is fixed an arc shaped member 5 made preferably of a nonmagnetic and non-conducting material such as bakelite, fiber, wood, etc. with two identical flat coils 6 and 7 of thin wire of any suitable form. These coils are indicated also on Fig. 2 in plan. Each coil is coaxial with a radius of the arc shaped segment 5. The free ends 8, 9, 10, 11 of the coils 6 and 7 shown on Fig. 2, are connected to the external controlling circuits by means of flexible wires 12, connection being made preferably near the knife edge 2' so as not to impair the freedom of the pendulum in its relative motion with respect to the ship. Two alternating current electromagnets 13 and 13' made of iron laminations of the type shown are fitted with arc shaped airgaps as shown, into which latter the arc shaped member 5 extends in such a manner that for a symmetrical position of the pendulum relatively to the electromagnets as shown in Fig. 1, the terminal planes 14 and 15 defining the internal sides of the electromagnets respectively cut the planes of the respective coils approximately in half. This is also indicated on Fig. 2 in plan. The electromagnets are energized by coils 16, 17 fed by a source of alterating current of a suitable frequency, such as for instance audio frequency convenient for amplification by means of known electron discharge tube circuits utilizing iron core transformers and the like. A radio frequency current can also be used with a suitable change in the circuits such as by the substitution of an air core for the iron core transformers and the like. The coils 16, 17 are shown connected to the terminals 16', 16" and 17', 17" of the circuit generating the alternating current not shown on Fig. 1.

In reality the relative dimensions of the electromagnets 13, 13' are considerably smaller than those of the pendulum, as shown, especially if a high frequency is used. Furthermore, the amount of power needed in this case is generally very small and can easily be obtained from a small tuning fork generator. The variable resistors 16a, 17a in series with the coils 16, 17 permit the adjustment of the amplitude of the alternating magnetic field used for the control and therefore the magnitude of controlling action. If the iron of the electromagnets 13, 13' (in case audio frequency is used) is not saturated the air gap flux is limited substantially to the projected area of the pole pieces since there is no appreciable fringing of the flux in this case.

Consider now the case when the pendulum is not placed symmetrically with respect to the electromagnets 13 and 13'. Assume for the sake of an example, that owing to the motion of the pendulum the number of flux linkages between the electromagnet 13 and the coil 6 increases and the corresponding flux linkages between the electromagnet 13' and the coil 7 decreases. This is shown in Fig. 2 in plan view in dotted lines. The dotted line 14' indicates the new position of the inner edge of the magnet 13 relatively to the coil 6 and 15' indicates the corresponding position of the inner edge of the magnet 13' relatively to the coil 7. Since the induced effective electromotive forces in the coils 6, 7 are respectively proportional to the effective values of the respective flux linkages with these coils, the voltage induced in the coil 6 has increased in its effective value by the amount proportional to the increase of the flux linkages as compared to its former value when the pendulum was in a symmetrical position relatively to the magnets or, which is clearly equivalent, when the ship was in its upright position. As regards voltage induced in coil 7 its value has decreased by equal amount. These voltage variations are proportional to the relative tilt of the pendulum and the support (i. e. ship).

In this invention these voltage variations are used for a directional control responsive to the angle of this relative tilt (more specifically to the angle of rolling) and also to higher time derivatives characterizing the development of this angle in time.

For this purpose I propose to use the controlling properties of electron or space discharge tubes of the type having a substantially electrostatic grid control, and I intend to use them as continuously acting inertialess relays. On Fig. 2 I have shown these tubes as being of the well known triode type but the use of any other type of the tubes such as tetrode, pentode or generally polyode is equally possible. The tubes are shown to be mounted in a differential or push pull arrangement.

The tubes 76, 77 are voltage amplification tubes of a high amplification factor; 24, 25 are coupling transformers of a suitable impedance whose primaries may be tuned to resonance by means of condensers 78 and 79 for the purpose of increasing the amplification of the first stage; tubes 18, 19 are power tubes of the directional control; tubes 20, 21 are power tubes of the angular velocity control (that is of the control by the first time derivative); tubes 22, 23 are of the power tubes of the angular acceleration control (i. e. second time derivatives). The filaments of all these tubes are connected all in parallel and heated by a common source not shown on Figure 2. Indirectly heated tubes can equally well be used. The filament-plate circuit of the tubes can be obtained either from a common or separate source of energy for voltage and power tubes as may be convenient. It is indicated on Fig. 2 by battery B common to all eight tubes. The tubes 18 and 19 are arranged to work as half wave rectifiers; for this purpose between the negative side of the filament (or between the cathode if indirect heating is used) of these tubes and the common point 80 of the secondaries of the transformers 24 and 25 a so called C battery 26 or its equivalent, is connected; it has for its purpose to lower the grid potentials of the tubes 18 and 19 to a suitable point at which these tubes function as half wave rectifiers with respect to alternating electromotive forces induced in the secondaries of transformers 24 and 25. The condensers 27, 28, 29, 30 and reactors 31, 32, 33, 34 are connected in the plate circuits of the tubes 18 and 19 in the well-known manner shown on Fig. 2, so as to form a filter system with respect to the alternating component of the plate currents. It is known from the properties of such filter systems that the currents flowing from the reactors 34, 32 in the wires 36, 35 respectively are steady nonfluctuating direct currents whose magnitude is substantially proportional (for the performance on the rectilinear part of characteristic) to the amplitude of the electromotive forces impressed on the grids of the tubes 18 and 19 and hence, also proportional to the values of the alternating voltages induced in coils 6 and 7 respectively. But as the last mentioned voltage, as was previously explained, is proportional to the angle of the ship's roll it follows that the departure of the currents flowing in the wires 36 and 35 from equal value is also proportional to the angle of deviation of the ship from its upright or, generally speaking, from a predetermined position relatively to the vertical line.

These currents 35 and 36 flow through differentially wound field coils of a direct current generator 37 shown diagrammatically as a bipolar machine. When the currents in the wires 35 and 36 are equal the generator is not excited since the ampere turns of the differentially wound field coils are equal and therefore cancel each other. In order to avoid the hysteresis phenomena which might otherwise interfere with the above mentioned performance the magnetic structure of the generator 37 as well as those of the generators 38, 39 described later on, are preferably, but not necessarily, made of a high permeability and low hysteresis materials such as ferro-nickel alloys and similar materials well known in the art. Under those conditions the electromotive force induced in the armature 40 of the generator 37 is proportional to the angle of the instantaneous roll both in magnitude and direction varying synchronously and continuously with the variations of this angle.

For the purpose of the angular velocity control I prefer to provide on the magnetic structure of the generator 37 a coil 41 having preferably a great number of turns of thin wire linking with the lines of flux in the magnetic circuit. From the law of induction it is known that when the flux through the coil 41 varies the voltage induced in that coil is proportional to the rate of variation of the flux and since the latter is itself substantially proportional to the angle of roll, it follows therefore that the electromotive force induced in that coil 41 is proportional to the instantaneous value of angular velocity of rolling continuously at any moment. In order to be able to utilize this electromotive force for controlling purposes I connect the middle point 42 of the coil 41 to the point 43 connected with the cathodes of the tubes 20, 21 and the extremities 44, 45 of this coil to the grids of these tubes. The anode circuits of the tubes 20 and 21 are connected with the differentially wound field coils of the generator 38 in exactly the same manner in which the anode circuits of the tubes 18 and 19 are connected with the differentially wound field coils of the generator 37. By a reasoning analogous to that made in connection with the generator 37 one can readily see that the field of the generator 38 and consequently the electromotive force induced in its armature 46 are proportional to the instantaneous value of angular velocity of rolling since the tubes 20 and 21 are controlled by the electromotive force induced in the coil 41 which is proportional to this angular velocity. A suitable biasing electromotive force can be inserted between the points 42 and 43 in order to bring the performance of the tubes 20 and 21 to the desired point of operation (not shown).

On the magnetic circuit of the generator 38 I place a coil 47 in which the induced voltages are proportional again to the rate at which the flux in the magnetic circuit 38 varies. But since this flux is in itself proportional to the angular velocity of rolling the electromotive force induced in the coil 47 being proportional to the rate of variation of this flux is therefore proportional to the instantaneous value of angular acceleration (the second time derivatives of angular motion) both in magnitude and in direction continuously at any moment. The control which I derive from the coil 47 applied to the tubes 22, 23 is exactly the same as that which is obtained from the coil 42 with respect to tubes 20 and 21 and the connections are exactly the same in both cases. It follows, therefore, that the instantaneous value of the flux in the machine 39 as well as of the voltage induced in its armature 48 are proportional to the corresponding instantaneous values of angular acceleration of rolling. It is clear that by providing a coil 49 on the magnetic circuit of the machine 39 and by adding another pair of tubes (not shown) a control responsive to the third time derivatives can be obtained and so on for still higher time derivatives.

From the foregoing explanation it is apparent that instead of using the coils 41, 42, 47 and 49 placed on the magnetic circuits of generators 37, 38 and 39 and linking with their respective fluxes, a similar rate of change control can be obtained by inserting in series with the output circuit of a tube a primary of a transformer and by using the electromotive forces induced in the secondary of this transformer for the purpose of the rate of change control shown in connection with the coils 41, 42, 47 and 49. This second alternative, that is, the use of separate transformers to be connected between the cathode and the grid of the tube is not shown. A similar arrangement holds naturally for the other side 72 of the push pull, (not shown).

In order to obtain a better performance it is desirable in such a case to use high initial permeability ferro-magnetic alloys since with a few amperturns on the primary it is possible to excite a considerable flux and to obtain appreciable electromotive forces in the secondary in spite of the slowness of the flux variation. It is to be understood that for the same reason the secondary must have a rather considerable number of turns in series. To protect the coils 41, 47, and 49 (or the secondaries if the transformers are used) against transient voltages when the circuit is closed or opened these coils can be split into a number of sections each closed on a voltage absorbing device such as small neon lamps, 81, 82, 83 shown on Fig. 2. It follows from the preceding description that the electromotive force induced in the armature 40 of the machine 37 is proportional to the angle $\theta$ of rolling both in magnitude and direction. It can be expressed therefore as $E=m.\theta$ where $m$ is a suitable coefficient of proportionality depending on the amplification and other constants of the circuits used. In a similar manner the electromotive forces induced in the armatures 46 and 48 can be represented by $$E_2 = n\frac{d\theta}{dt} \text{ and } E_3 = p\frac{d^2\theta}{dt^2}$$

respectively where $n$ and $p$ are again coefficients of proportionality, similar to $m$, and $$\frac{d\theta}{dt} \text{ and } \frac{d^2\theta}{dt^2}$$

are instantaneous values of angular velocity and angular acceleration respectively.

The three exciters 37, 38, 39 are connected in series with each other and in series also with the field coil 52 of an electric generator 54 driven by a prime mover not shown. The magnetic structure of the generator has another field winding 53 of a differential or split type whose middle point is connected to one terminal 55 of the supply; the other terminal 56 of the supply is connected to a movable contact 57' suitably mounted on the sliding block 57. The block 57 is in threaded engagement with the shaft 58 of a separately excited motor 59 whose armature is directly connected to the armature of generator 54. From the preceding description it follows that the exciting current flowing through the generator's field coil 52 and hence, the field of the generator 54, for a non-saturated condition of the latter, is proportional to a linear function of the type $$m\theta + n\frac{d\theta}{dt} + p\frac{d^2\theta}{dt^2}$$

of angle, angular velocity and angular acceleration of rolling. It is clear that under these conditions the voltage generated in the armature 54 is also proportional to, or in general is a certain function of, the same quantity.

The motor 59 whose armature is connected to the armature 54 of the generator will start to run in the direction corresponding to the polarity of the armature 54 and the contact 57 will be moved along the potentiometer resistor 60 which unbalances the currents in the half coils of the winding 53. The connection between the external terminals of this field winding and potentiometer resistor 60 must be such that the amount of unbalancing produced in the field 53 by the motion of the contact 57' along 60 offsets the effect of the primary regulation developed by the field. Under these conditions to a given instantaneous value of the linear function $$m\theta + n\frac{d\theta}{dt} + p\frac{d^2\theta}{dt^2}$$

a definite displacement of the travelling nut 57 from its middle position will correspond at all times, namely, such displacement at which the degree of the unbalance of magnetomotive forces produced in the half coils of the field 53 offsets the magnetomotive force produced by the regulation of the field 52 in response to this linear function $$m\theta + n\frac{d\theta}{dt} + p\frac{d^2\theta}{dt^2}$$

characterizing the instantaneous state of angular motion of rolling.

The motor 59 under these conditions is well adapted to operate the displacement of the moving weight as disclosed in my copending patent application Ser. No. 415,663 filed December 21, 1929, in which the advantages of such a compound positional dynamical control are extensively explained in connection with the problem of antirolling stabilization of ships. The addition of the field 53, and of the potentiometer resistor 60 operated by the contact 57 displaced by the motor 59 constitutes the electrical follow up arrangement relative to this motor 59.

Having described this invention I wish to describe now its behaviour in a few typical instances in which its advantages are particularly well seen. Assume for example that beginning with a given instant of time, when the ship was level, a relatively constant disturbance (e. g. gust of wind) suddenly strikes the ship tending to heel it over. During a rather short time interval when in the relative motion the pendulum just begins to swing (or, rather, when the ship just begins to roll relatively to the vertical datum line evidenced by the pendulum)—one can assume that the angular motion starts in a parabolic manner, that is $\theta = at^2$ the angle begins to increase as a square of the time since the forces of buoyancy are yet small enough for the small angles assumed and the action of the wind is strong enough by our assumption to be considered alone in conjunction with the angular inertia of the vessel. It may be noted that any motion starting from zero can be approximated by a parabolic law within a sufficiently close range with respect to the beginning of the disturbance. In this case the voltage induced in the armature 40 of the generator 37 is also negligible since it is proportional to the angle which we assumed to be small in the beginning since it is of the order of $t^2$ (small quantity of the second order). As to the voltage induced in the armature 46 of the generator 38 it is proportional to $$\frac{d\theta}{dt} = 2at,$$

that is, although also small it is, however, slightly more important than that of the generator 37 since it is of the first order. Finally the voltage generated in the armature 48 of the generator 39 is proportional to $$\frac{d^2\theta}{dt^2} = 2a,$$

that is, this voltage from the very beginning of the parabolic transient jumps up to its full finite value which is constant as long as the transient continues to be of a parabolic nature. In other words the exciter 39 will start a powerful action in the control system and this action will appear right at the very tendency of the ship to roll prior to any finite disturbance having been developed. In other words, the angular acceleration responsive generator 39 will respond to the full extent to the cause (i. e. gust of wind in this case) and not to the effect (i. e. development of the disturbing deviation)—hence its advantage as the phase advancer of the control action whereby this control acquires very marked anticipatory properties.

The above described properties of the system are quite general and are applicable to other angular motions whether aperiodic or periodic; in any particular case the subsequent stages of the system will produce subsequent differentiations with respect to time of the original relative angular movement between the pendulum and its supporting system (i. e. ship). The above described theoretical performance relates to the case when the various parts of the scheme function on the rectilinear parts of their respective characteristics which can always be obtained with a sufficient degree of accuracy by suitable design of the system.

I can also use coils of different forms and vary in this manner the characteristics of the controlling system. In case of rectangular coils shown on Fig. 2 the variation of the number of flux linkages through the coil is $d\phi = B \cdot n \cdot w \, dx$ where $B$ is the magnetic flux density, assumed here as constant.

$w$ is the effective width of the coil which is constant in this case.

$n$ is the number of turns in series in the coil.

$dx$ is the linear displacement of the coil clearly equal to $L \cdot d\theta$ where $L$ is the length of the pendulum (from its center to the center of the airgap).

When the coils 6, 7 have a form different from the rectangular form shown on Fig. 2 the width $w$ is not constant and the law of its variation as a function of displacement depends on the form of the coil used.

For example in case of a triangular coil, as shown on Fig. 2a, entering the zone of the flux shown by dotted lines I and II, by the angle of the triangle one can show mathematically that the law of variation of the flux linkages resulting from the relative motion is represented by an increasing quadratic function of the relative displacement $x$, and is therefore of the form $\phi = Ax^2$, where $A = \tfrac{1}{2} Bnb$ is a constant of proportionality, and where $b$ is a factor depending on the angle $\psi$ of the coil.

When the same coil is turned to the flux by a base as shown on Fig. 2a relatively to the flux projection II one can easily show that the law of variation of $\phi$ is a function of departure represented by a decreasing quadratic function of $x$. Thus by giving the coils various shapes I can change the characteristics of controlling actions derived from the movement in any desired manner.

In all cases the amplitude of the electromotive force induced in the coil is proportional to the integrated value of the flux over the area of the coil.

In addition to these changes in the form of the coil obtained from known functional relations, I can also vary the form of these coils so as to fulfill certain experimental conditions not having any definite analytical expression. For example a curve shown on Fig. 2b gives a comparatively considerable amount of modulation owing to its considerable width $w_0$ and hence of regulation when the portion A thereof enters or leaves the region of the flux. This condition can be conveniently used for overcoming the static friction of the motor 59 shown on Fig. 2 around its reversing point. Once this friction has been overcome less controlling action for unit displacement between the primary and the secondary elements is required and the subsequent width $w_1$ of the coil can be accordingly reduced as shown on Fig. 2b.

Results equivalent to those mentioned in connection with the variation of the form of controlling action as given in the above equation for $d\phi$ can be accomplished by giving to the flux a desired predetermined distribution obtained e. g. by means of a suitable airgap variation or distribution of the turns of the coils. In this case the factor $B$ becomes variable and the coils during their motion enter the zones of varying flux density.

One can modify in this manner the functional character of the control in any desired way and for a given relative movement to obtain a controlling action different from that which corresponds directly to the motion as this is the case of the regulation obtained by means of the rectangular coils 6 and 7 shown on Fig. 2.

I wish it to be understood that although I have described the controlling system in application to ship stabilizing or roll quenching apparatus, the scope of the invention is much broader than this particular application. Its use can obviously be extended for stabilization of other dirigible craft such as submarines, airships, airplanes, and the like, not only for antirolling but also for antipitching stabilization. In this latter case I can use either another pendulum responsive to pitching which is obtained by placing the knife edge 2' athwartship or still better, I can employ a long period gyroscopic pendulum of the so-called artificial horizon type mounted within a gimbel suspension, and having two mutually perpendicular segments 5 and 5' with coils 6 and 7, and 6' and 7' respectively, shown on Fig. 3. It is obvious that another pair of magnets analogous to electromagnets 13 and 13' and corresponding to the coils 6' and 7' must be provided; the four pole faces of electromagnets must be suitably designed so that no interference between two angular motions should take place, which is known to those skilled in the art.

In addition to these properties of a directional stabilization which can be accomplished by these means this invention can be used also for controlling the conditions of equilibrium of a dynamical system, about a certain predetermined state of motion. This last mentioned case can be better illustrated by taking as an example a centrifugal, hydraulic, or other governor for a steam turbine or other steam or gas engine, of the usual type responsive to speed. The following description as is apparent, applies equally to any form of governor although for purposes of illustration it is disclosed in relation to a centrifugal governor. It is well known that the governors of this kind utilize the departure of the speed from its set value for the purpose of correcting this original departure. It is equally known that the governors based on this principle are usually sluggish and subject to hunting after sudden changes in the load or resulting from friction or other disturbances. Mechanical damping systems such as dash-pots and the like, are generally used to dampen out these oscillations, but as was mentioned such means are effective only when the departure has already developed to a substantial degree and are therefore unable to prevent its development.

In accordance with the present invention the motion of the coils 6 and 7 in the alternating magnetic field is used again for the purpose of a control similar to that previously described. Referring to Fig. 4, 100 is the regular Watts governor shown in its well known simple form; 101 is a sleeve sliding up and down the vertical shaft of the governor when the speed varies. This motion of the sleeve is transmitted through the link 102 to a lever 103 fulcrumed about the axis 104 perpendicular to the drawing which thus transmits the motion to the plate 5a made preferably of a non-magnetic and non-conducting material such as bakelite or wood for example, which plate carries again two coils 6 and 7, as already described, capable of being displaced relatively to the poles 13 and 13' of electromagnets also previously described and shown in projection by dotted lines. The arrangement being exactly the same as in the case shown on Fig. 2. The valve of the steam turbine is operated in this case by the shaft 58 of the motor 59. It can be shown by an analysis similar to that used in the theory of hunting of prime movers regulated by centrifugal governors that the presence of higher time derivatives will rapidly check the development of the disturbance at its very inception and wipe out the residual amount thereof in a dead beat aperiodic or exponential manner. One can also understand this advantage from a more elementary discussion of the behaviour of the system under the effect of a disturbance developing in time as a parabolic function which case can approximate sufficiently any kind of disturbances growing from zero, at least in their very beginning.

The disclosed arrangement can be also applied in conjunction with gyroscopic angular velocity indicating apparatus, for example, of the type described in my Patent No. 1,372,184. Fig. 6 indicates by way of example this particular application representing the plan view of the instrument corresponding to Fig. 3 of the patent above referred to. The gyroscopes 400, 401 have two lever-links 402, 403 connected to two points 406, 407, of the lever 405, supporting at its ends the coils 408, 409 shown in plan view. The alternating magnetic fluxes are produced by electromagnets or their equivalents 410 and 411, and are directed perpendicularly to the paper and shown in dotted lines. When a rotation of the instrument shown on Fig. 6 occurs about an axis perpendicular to the plane of the drawing, as disclosed in said patent, the gyroscopes tilt in opposite directions and this causes the rotation of the lever 405 in the plane of the drawing about a point between the fulcrum points 406 and 407, which causes the known reactions of the control circuit shown on Fig. 2. Since the angle of deviation of the lever 405 shown on Fig. 6 is proportional to angular velocity, the tubes 18, 19 will respond to angular velocity, tubes 20, 21 to angular acceleration and tubes 22, 23 to the rate of angular acceleration (that is to the third time derivative of angular motion).

The remaining features of such a control are again exactly the same as previously described in connection with Fig. 2.

The arrangement shown in Fig. 2 must be considered as illustrative and not in a limiting sense. For example in reality instead of three separate machines 37, 38, 39, one can use one single machine of a special design shown on Fig. 7 having three independent field structures 200, 201, 202 combined in the same frame and energized each in exactly the same manner in which the differential fields of the machines 37, 38, 39 shown on Fig. 2 are energized from the power tubes 18, 19, 20, 21, 22, 23 respectively. The composition of electromotive forces proportional to the angle of the pendulum and its first and second time derivatives in this case takes place within the conductors of the armature 203.

Finally, instead of using three different magnetic structures mounted within one single frame, one can use one single magnetic structure with three sets of differentially wound coils connected to the power tubes 18 and 19, 20 and 21, 22 and 23 respectively. In such a case the composition of controlling actions proportional to the angle and its first and second time derivatives occurs in the magnetomotive forces of individual coils acting on the same magnetic circuit. The use of the coils 41, 47, 49 shown on Fig. 2 is impossible in this last mentioned case and separate transformers must be used.

In certain cases instead of a complete circuit shown on Fig. 2 and utilizing the control responsive to a function of the type $$m\theta + n\frac{d\theta}{dt} + p\frac{d^2\theta}{dt^2}$$

a more simplified arrangement can be used omitting some of its terms. By way of an example this is shown on Fig. 5 in which a regular follow up control responsive to the angle $\theta$ only is shown. The instrument shown can be substituted for an analogous instrument shown on Fig. 3 of my co-pending patent application Ser. No. 415,663. 301 designates a pendulum with counterweights 303, 304. Electromagnets 312, 313 energized by the coils 316, 317 carrying alternating currents are mounted on an arc shaped member 320 coaxial with the edge of the knife and capable of being rotated about the axis of the pendulum within a support 321 by means of a motor 322 through a worm 323 coacting with a worm wheel 324 coaxial with the axis of freedom of the pendulum. The control of the motor 322 can be easily seen from Fig. 2 in which the motor 322 is identified with motor 59, tubes 20, 21, 22, 23 and their associated circuits are omitted as is the follow up arrangement 60 with a movable contact 57. For any angle of roll the secondary follow up system 320 at all times will seek a position at which the magnets 312, 313 and therefore the secondary system 320 are symmetrical with respect to the pendulum.

A follow up system of this type has all properties of follow up systems using trolley contacts, for example as far as hunting is concerned, but is superior to it because of absence of any frictional reactions. It can easily be made "dead beat" if the angular velocity responsive tubes 20, 21, and for a still greater accuracy angular acceleration responsive tubes 22, 23, are added. A follow up system of such improved dead beat type can be successfully used in conjunction with fire control applications, partial stabilization of guns and similar objects which must maintain a fixed invariable direction in space independently of rolling and pitching movements of the platform (i. e. ship) on which they are mounted and in all similar problems of partial stabilization of instruments on board ships and airships and the like.

This invention can also be produced with entirely different means but the final result obtained remains substantially the same as above described.

As previously stated I can employ as physical directed quantity the light of any wave length, such as, for example, the visible light. The physical directed quantity above referred to in this case is the luminous flux and its operative association with a light responsive, or more generally, with a radiation responsive device replaces here the operative association between the magnetic flux and the coils disclosed in the preceding description.

By way of an example I have shown an arrangement of this type on Fig. 8 in which the whole arrangement remains substantially the same as that shown on Figs. 2 and 5 with the exception that instead of the magnetic control shown on Fig. 5—the light, or more generally, the radiation responsive control is employed.

The mechanical part of the pendulum itself, as far as supporting rod, counterweights 303, 304, prism, etc. are concerned remains exactly the same in case of the arrangement shown on Fig. 8 as it is on Fig. 5.

Referring to Figs. 8 and 9 the secondary element 520 of the follow up system shown on Fig. 8 supports a light producing and projecting apparatus 506. The parallel beam of light 507 shown only at the point of its emergence and indicated in dotted lines for the remaining part of its projectory passes behind the pendulum and then is suitably reflected by means of two mirrors not shown, or other reflecting means suitably positioned near the axis of oscillation of the pendulum 501 so as to produce reflected beams substantially symmetrical with respect to the incident beam as shown. The reflected beams are shown to fall on two radiation responsive devices shown as photo electric cells 512 and 513.

A motor 508 supported by the secondary element drives a disc 509 having on its periphery a number of equidistant holes 510 so as to produce a periodical "chopping" or modulating of light in the manner well known in the art.

Attached to the pendulum at its lower part 505 are two frames 516 and 517 into which are fitted light absorbing, films 518, 519 constituted by means of a suitable deposit of semitransparent materials.

It is well known, for example, that the metallic germanium is capable of adhering to the glass and of forming thin films of any desired degree of thinness and therefore of absorption. The thickness of the metal thus deposited and hence the degree of its transparence can be predetermined as function of the distance $x$ indicated on Fig. 9 by a known chemical or other methods.

I prefer to arrange the deposition of films on the supporting transparent matter such as glass and the like, in such a manner that the thickness of the film and hence its coefficient of absorption remains substantially the same along the line parallel to the axis XX of oscillation of the pendulum (Fig. 9) but along the perpendicular direction this thickness should vary according to a certain predetermined law. On Fig. 9 I have shown this by the density of lines indicating greater or smaller absorbing capacity of the films. Thus for example near the central portion of the figure the absorbing capacity of the film is greater than toward their outward edges.

When the primary (i. e. pendulum) and the secondary elements are in their relative zero position as shown in Fig. 8 the intensity of light falling on the windows 530 and 531 of photo electric cells 512, 513 is the same. For a departure from this symmetrical condition this equality of illumination is lost. Thus, for example, assume that in the relative motion the pendulum moves in the direction of the arrow (i. e. to the left) with respect to the secondary system. In such a case the window 530 of the photoelectric cell 512 will receive less light than before, owing to a gradually increasing thickness of the absorbing layer and for the window 531 of the photo cell 513 on the contrary will receive more light than before when the primary and the secondary elements were symmetrical with respect to each other. Under the influence of a decreasing intensity of the luminous flux falling on the photo cell 512 the photo electronic emission of this cell will decrease, whereas in the cell 513 the emission will increase as a result of an increased intensity of illumination. These variations of illumination which in general may be also accompanied by variations of the wave length of the light transmitted by the films 518, 519 cause variations in the photo electric emission of photo electric cells in the well known manner.

The photoelectric cells can be connected to the first stage of the electron discharge tube system shown on Fig. 2 in any well known manner not shown on Fig. 8, and the performance of the electrical controlling system when operated from the radiation responsive system will be substantially the same to the previously described case utilizing relative motion of magnetic flux and coils 6 and 7. From the preceding description it is apparent that the distribution of the coefficient of absorption of the films or other absorbing material along the axis of $x$ shown on Fig. 9 permits of obtaining different functional relations between the relative displacement of the primary and secondary elements on one hand, and the characteristics of the control action on the other hand, in a manner substantially similar to what has been already explained in connection with different forms of the coils shown on Figs. 2a and 2b.

Both methods, namely the variable form of the coils and/or non-uniform airgap, in case of the magnetic flux linkages control and the distributed density of the radiation absorbing medium, in case of the radiation responsive control, can be described as means for varying the characteristics of the controlling action by means of a suitable variation of the parameters of the system formed by flux producing and flux receiving or responsive means.

In the above statement the word "parameter" is used in the sense generally attached to it in science as distinguishing from the expression "independent variable".

Thus, for example, for a given form of the coils, or for a given distribution of light absorbing layer, the functional relation between the angle $\theta$ of departure between the primary and the secondary elements and the magnitude of the controlling action is a definite function, as well as the higher derivatives corresponding to this function.

By changing the form of the coils, as disclosed in connection with Figs. 2a and 2b or by changing the distribution of the radiation absorbing means, as explained in connection with Fig. 9, the above mentioned functional relation can be changed and it is my intention to specify this important feature of this invention as a means for varying the characteristics of the controlling action by means of a suitable variation of parameters defining the operative association between flux producing and flux receiving means.

It is apparent that when a certain predetermined functional relation F ($\theta$) is introduced either by means of a certain form of the coils, as disclosed in connection with the magnetic flux method, or when a certain distribution of the radiation absorbing material is utilized in connection with the luminous flux method, the deviation and higher time derivatives responsive means such as exciters 37, 38, 39 shown on Fig. 2 do not respond to $$\theta, \frac{d\theta}{dt}, \frac{d^2\theta}{dt^2}$$

respectively as in case of the rectangular coils 6, 7 shown on Fig. 2 but respond to $$\theta \cdot F(\theta), \frac{d}{dt}[\theta \cdot F(\theta)] \text{ and } \frac{d^2}{dt^2}[\theta \cdot F(\theta)]$$

where F ($\theta$) is a certain predetermined distribution function appearing as a parameter above referred to. This permits of obtaining a great variety of control characteristics which can be thus arranged to match the characteristics of disturbances encountered in each particular case in such a manner that the disturbance is kept in check preferably in a continuous manner and at all times on the part of the controlling action.

In summing up the preceding description of different embodiments of this invention, it can be stated that the fundamental or basic idea of this invention consists in the provision of a method and means for a non-reactive frictionless control of dynamical systems of the follow up type or of the systems having characteristics substantially similar to those of a dynamical follow up system or of an indicating, measuring, recording or other control system by establishing an operative association between a flux generated by a flux producing means supported by, or operatively associated with, one (either primary or secondary) element of said follow up system and a flux responsive means supported by, or operatively associated with, the other element of said system.

Furthermore, the method and the means above referred to are so arranged that any initial loss of a predetermined equilibrium condition between the primary and the secondary elements causes a controlling action on the part of the controlling system responsive to a predetermined function of the deviation of said dynamical system from its predetermined point of equilibrium and to the plurality of high time derivatives of that deviation. In case the predetermined function above referred to is reduced to unity which occurs, for instance, in the case when the controlling coils shown on Fig. 2 have a rectangular form the controlling system instead of responding to a predetermined function of the deviation and to the plurality of higher time derivatives of that predetermined function, is responsive directly to a linear function of a deviation and to the plurality of higher time derivatives of that deviation.

I wish it to be understood that the preferred embodiment and a few of its possible modifications shown must not be construed as limiting, since a still greater variety of modifications of this present invention can easily be worked out by those skilled in the art without any departure from the spirit and scope of the appended claims.

I claim:

1. In an electrical controlling system of the follow up type, a primary reference element, a secondary follow up element, said elements capable of relative movement, a source of power operatively associated with said secondary element, a flux producing means operatively associated with one of said elements, a flux responsive means operatively associated with the other said element, a continuously acting relay system operatively associated with said flux responsive means and continuously responsive to a predetermined function of the relative displacement of said elements and of the time rate of change of said displacement, and controlling said source so as to reduce said relative movement whereby a follow up action is produced.

2. In an electrical controlling system of the follow up type, a primary reference element, a secondary follow up element said elements capable of relative movement, a source of power operatively associated with said secondary element, a flux producing means operatively associated with one of said elements, a flux responsive means operatively associated with said other element, a continuously acting relay system operatively associated with said flux responsive means, and continuously responsive to a predetermined function of relative displacement of said elements, of the time rate of change of said displacement, of the time rate of said first mentioned time rate, and controlling said source so as to reduce said relative movement whereby a follow up action is produced.

3. In an electrical controlling system of the follow up type, a primary reference element, a secondary follow up element, said elements capable of relative movement, a source of power operatively associated with said secondary element, a flux producing means operatively associated with one of said elements, a flux responsive means operatively associated with the other said element, a continuously acting relay system operatively associated with said flux responsive means, and continuously responsive to a predetermined function of relative displacement of said elements and of a plurality of higher time derivatives of said predetermined function and controlling said source so as to reduce said relative movement whereby a follow up action is produced.

4. In an electrical controlling system of the follow up type, a primary reference element, a secondary follow up element, said elements capable of relative movement, a source of power operatively associated with said secondary element, a flux producing means operatively associated with one of said elements, a flux responsive means operatively associated with the other said element, a continuously acting relay system operatively associated with said flux responsive means, and continuously responsive to a predetermined function of relative displacement of said elements and a higher time derivative of said predetermined function, and continuously controlling said source so as to reduce said relative movement whereby a follow up action is produced.

5. In an electrical controlling system of the follow up type, a primary reference element, a secondary follow up element, said elements capable of relative movement, a source of power operatively associated with said secondary element, a flux producing means operatively associated with one of said elements, a flux responsive means operatively associated with the other said element, a continuously acting relay system operatively associated with said flux responsive means, and continuously responsive to the combined effect of the relative displacement of said elements and of the first and of the second time derivatives of said displacement, and controlling said source so as to reduce said relative movement whereby a follow up action is produced.

6. In an electrical controlling system of the follow up type, a primary reference element, a secondary follow up element, said elements capable of relative movement, a source of power operatively associated with said secondary element, a flux producing means operatively associated with one of said elements, a flux responsive means operatively associated with the other said element, a continuously acting relay system operatively associated with said flux responsive means, and continuously responsive to the combined effect of the relative displacement, of said elements and to a plurality of higher time derivatives of said displacement, and controlling said source so as to reduce said relative movement whereby a follow up action is produced.

7. In an electrical controlling system of the follow up type, a primary reference element, a secondary or follow up element, a source of power operatively associated with said secondary element, an electron discharge tube system responsive to a relative displacement of said elements, another electron discharge tube system operatively associated with the first mentioned tube system and continuously responsive to the rate at which the relative displacement of said elements takes place and means for combining the controlling actions of said tube systems for the purpose of a resultant control of said source so as to reduce continuously said displacement whereby a substantially dead beat follow up action is produced.

8. In an electrical controlling system of the follow up type a primary reference element, a secondary follow up element, a source of power operatively associated with said secondary element in a driving relation, an electron discharge tube system responsive to a relation displacement of said elements, a second electron discharge tube system operatively associated with said first mentioned tube system and arranged to respond continuously to the rate at which said displacement takes place, a third electron discharge tube system operatively associated with the second mentioned tube system and continuously responsive to the rate at which the last mentioned rate of displacement takes place, means for combining the responses of said tube systems into a continuous resultant action controlling said source so as to reduce said displacement in a substantially continuous aperiodic manner whereby a follow up action is produced.

9. In an electrical controlling system of the follow up type, a primary reference element, a secondary follow up element, a source of power operatively associated in a driving relation with said secondary element, an electron discharge tube system responsive to the relative displacement of said elements and to the plurality of higher time derivatives of said displacement and controlling said source in a continuous manner whereby a substantially dead beat follow up action is produced.

10. In an electric controlling system, an alternating magnetic flux producer having a relatively sharply defined path of flux flow, a coil movable in a direction transversely of said path, said coil having a geometrical outline asymmetrical relative to a median line transverse of said direction and of inconstant effective width as the coil moves relative to the path of flux, whereby the current induced in the coil varies as a predetermined function of the movement of the coil relative to the flux.

11. In an electrical controlling system of the follow-up type, a primary and a secondary element, means for producing an alternating magnetic field of a sharply localized air gap area operatively associated with one said element, a coil means of a predetermined geometrical form operatively associated with the other of said elements, and capable of relative displacements within said air gap area, controlling means responsive to the instantaneous value of flux linkages intercepted by said coil means, controlling means responsive to the plurality of higher time derivatives characterizing the variation of said linkages as a function of time, power plant operatively associated with said secondary element and producing the following up in response to the combined effect of both controlling means whereby a substantially aperiodic and rapid following up is produced to control the equilibrium position of the coil in the air gap.

12. In an electrical controlling system of the follow-up type comprising a primary and a secondary element, mtans for producing an alternating magnetic field of a sharply localized air gap area and operatively associated with one of said elements, a coil member of a predetermined geometrical form capable of relative displacements with respect to said gap area and operatively associated with the other of said elements, controlling means continuously responsive to the instantaneous value of flux linkages through said coil member, controlling means responsive to time rate of variation of said flux linkages, power plant operatively associated with said secondary element and controlling the equilibrium position of said coil member within said flux area in response to the combined action of the first and the second mentioned controlling means whereby a substantially aperiodic and rapid follow-up action is produced.

13. In an electrical controlling system of the follow-up type comprising a primary and a secondary element, means for producing an alternating magnetic flux of a sharply localized air gap area and operatively associated with one of said elements, a coil member of a predetermined geometrical form capable of relative displacements with respect to said field area and operatively associated with another said element, controlling means continuously responsive to the instantaneous value of the flux linkages through said coil member, controlling means responsive to the time rate of variation of said flux linkages, controlling means responsive to the time rate of the first mentioned time rate, power plant operatively associated with said secondary element and controlling the equilibrium position of said coil member within said flux area in response to the combined action of all said controlling means whereby a substantially aperiodic and rapid follow-up action is produced.

14. An electrical controlling system of the follow-up type comprising a primary and a secondary element, a plurality of direct current generators having armatures connected in series, a direct current motor connected across the terminal voltage of said generators and operatively associated with the secondary follow-up element, a plurality of thermionic vacuum tube systems respectively operatively associated with respective generators, means for producing an alternating magnetic flux of a sharply localized air gap area and operatively associated with one of said elements, a coil member of predetermined geometrical form arranged for relative displacement with respect to the gap area and operatively associated with the other of said elements, one thermionic vacuum tube system continuously responsive to variation in e. m. f. induced by variation of flux linkages in the coil and energizing the magnetic field of a generator, another vacuum tube system controlled by the electromotive force induced in the coil operatively associated with the magnetic system of said generator and controlling the excitation of the second generator, the whole so arranged whereby continuous follow-up is produced in response to instantaneous value of the flux linkages through said coil and to the time rate of its variation.

15. An electrical controlling system of the follow-up type comprising a primary and a secondary element, a plurality of direct current generators having armatures connected in series, a direct current motor connected across the terminal voltage of said generators and operatively associated with the secondary follow-up element, a plurality of thermionic vacuum tube systems respectively operatively associated with respective generators, means for producing an alternating magnetic flux of a sharply localized air gap area and operatively associated with one of said elements, a coil member of predetermined geometrical form arranged for relative displacement with respect to the gap area as a result of relative movement and operatively associated with the other of said elements, one thermionic vacuum tube system continuously responsive to variation of flux ligkages through the coil and energizing the magnetic field of a generator, another vacuum tube system controlled by the electromotive force induced in the coil operatively associated with the magnetic system of said generator and controlling the excitation of the second generator, a third vacuum tube system operatively associated with the magnetic system of the second generator and controlling the field of the third generator, the whole so arranged whereby a continuous following-up is produced in response to the instantaneous value of the flux linkages through said coil to the time rate of change of said linkages and to the time rate of said time rate.

NICOLAI MINORSKY.